(12) United States Patent
Chan et al.

(10) Patent No.: US 7,570,348 B2
(45) Date of Patent: Aug. 4, 2009

(54) METHODS AND APPARATUS FOR NAVIGATING A SURFACE

(75) Inventors: Lye Hock Bernard Chan, Penang (MY); Srinivasan Lakshmanan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 261 days.

(21) Appl. No.: 11/640,760

(22) Filed: Dec. 18, 2006

(65) Prior Publication Data

US 2008/0144010 A1    Jun. 19, 2008

(51) Int. Cl.
*G01N 21/00* (2006.01)
(52) U.S. Cl. .......................................... 356/73
(58) Field of Classification Search ............... 356/73, 356/520, 450, 614
See application file for complete search history.

(56) References Cited

U.S. PATENT DOCUMENTS

| 6,256,016 | B1 * | 7/2001 | Piot et al. .................... 345/166 |
| 6,847,353 | B1 | 1/2005 | Sasselli et al. |
| 7,161,682 | B2 * | 1/2007 | Xie et al. ..................... 356/520 |
| 7,205,521 | B2 * | 4/2007 | Gruhlke et al. ........... 250/206.2 |
| 7,315,013 | B2 * | 1/2008 | Siah et al. ................. 250/208.1 |
| 7,321,359 | B2 * | 1/2008 | Xie et al. ..................... 345/163 |
| 2005/0024623 | A1 * | 2/2005 | Xie et al. ................... 356/3.01 |
| 2005/0024624 | A1 | 2/2005 | Gruhlike et al. |

\* cited by examiner

*Primary Examiner*—Tarifur R. Chowdhury
*Assistant Examiner*—Isiaka O Akanbi

(57) ABSTRACT

In one embodiment, a surface is navigated by 1) using a first light sensor, mounted to a navigation device, to detect light reflected from a surface, and 2) using outputs of the first light sensor, over time, to determine relative movement of the navigation device with respect to the surface. While using the first light sensor, it is determined whether the outputs of the first light sensor, over time, are indicating movement of the navigation device with respect to the surface. If not, 1) a second light sensor that is mounted to the navigation device, and of a different type than the first light sensor, is used to detect light reflected from the surface, and 2) outputs of the second light sensor, over time, are used to determine relative movement of the navigation device with respect to the surface.

6 Claims, 5 Drawing Sheets

METHODS AND APPARATUS FOR NAVIGATING A SURFACE

BACKGROUND

Early optical computer mice used speckle-based light sensors to detect light reflected from a surface. For example, a computer mouse might have used sets of perpendicularly-oriented photodiodes to generate time-varying x-direction and y-direction outputs corresponding to movement of the mouse over a surface. These outputs could then be relayed to a computer system so that the computer system could determine the relative movement of the mouse with respect to the surface.

More recently, optical computer mice have used image-based light sensors to detect light reflected from a surface. For example, a computer mouse might acquire successive images of the light that is reflected from a surface. A navigation engine (typically on-board the mouse) will then compare successive ones of the images to generate time-varying x-direction and y-direction outputs corresponding to movement of the mouse over a surface.

BRIEF DESCRIPTION OF THE DRAWINGS

Illustrative embodiments of the invention are illustrated in the drawings, in which.

DETAILED DESCRIPTION

In the following description and attached drawings, like reference numbers appearing in different drawings are used to refer to like elements or method steps.

Optical computer mice that employ image-based light sensors are typically preferred over mice that employ speckle-based light sensors. This is because image-based light sensors and their associated navigation engines are typically able to 1) navigate (or track) more surfaces, and 2) navigate with more precision (i.e., with a greater degree of resolution). However, despite their superior navigation abilities on most surfaces, image-based light sensors can perform poorly on some surfaces, such as glass surfaces. This is because glass surfaces are typically very smooth, with few surface defects to scatter light at different angles. Thus, glass surfaces tend to reflect coherent light, rather than scattered light, and the navigation engines associated with image-based light sensors have a hard time finding enough image features to reliably compare the differences between two successive surface images. And, often, navigation engines are programmed to treat images as "noise", and signal no mouse movement, if fewer than a minimum number of features are detectable in an image.

To improve the navigation performance of an optical computer mouse (or any other optical navigation device), it is proposed herein to provide a navigation device with first and second light sensors of different types, and to switch between using one or the other of the light sensors, depending on which light sensor provides better performance for a particular surface.

Figure 1:
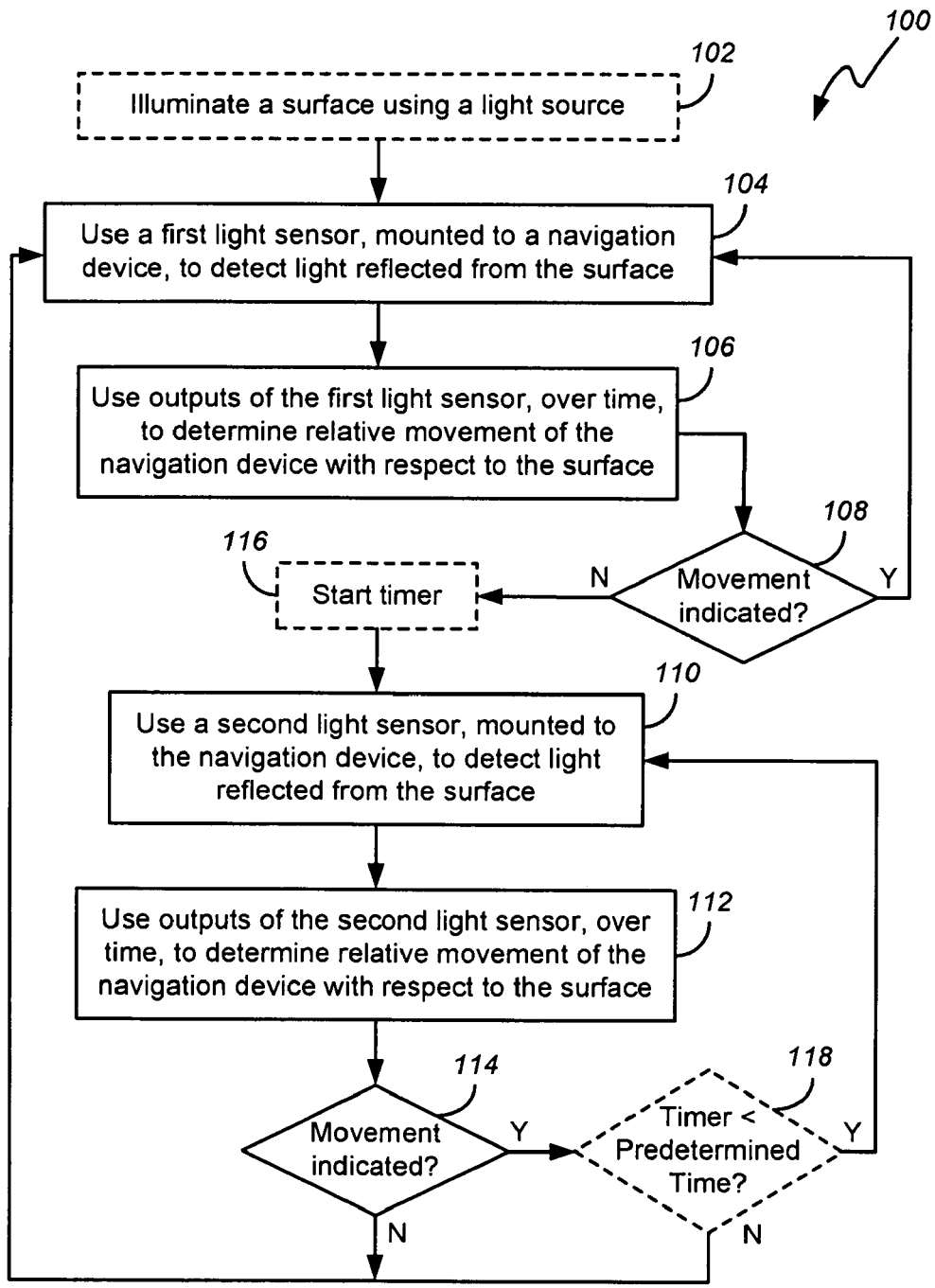
FIG. 1 illustrates a first exemplary method for navigating a surface.

In accord with the invention, FIG. 1 illustrates an exemplary method 100 for navigating a surface. The method 100 uses a first light sensor, mounted to a navigation device, to detect light reflected from a surface (see block 104). Outputs of the first light sensor, over time, are then used to determine relative movement of the navigation device with respect to the surface (see block 106). While using the first light sensor, it is determined whether the outputs of the first light sensor, over time, are indicating movement of the navigation device with respect to the surface (see block 108). If not, a second light sensor mounted to the navigation device, which is of a different type than the first light sensor, is used to detect light reflected from the surface (see block 110). Outputs of the second light sensor, over time, are then used to determine relative movement of the navigation device with respect to the surface (see block 112).

In one embodiment of the method 100, it may be determined whether the outputs of the second light sensor, over time, are indicating movement of the navigation device with respect to the surface (see block 114). If not, the method 100 may revert to using outputs of the first light sensor to determine whether there is relative movement of the navigation device with respect to the surface. In the same embodiment of the method 100 (or in a different embodiment), the first light sensor may be used as a default light sensor. The method 100 may then time how long the outputs of the second light sensor are used to determine relative movement of the navigation device with respect to the surface (see block 116), and after a predetermined time, the method 100 may revert to using output of the first light sensor to determine whether there is relative movement of the navigation device with respect to the surface (see block 118).

In some cases, the light sensor that is used to determine movement of the navigation device may be switched as soon as there is a failure to detect movement of the navigation device. However, in a preferred embodiment of the method 100, light sensors are only switched after the lapse of a period of time (t) in which no movement has been detected. The length of the period of time (t) may be adjusted so as to 1) mitigate unnecessary switching of the light sensors, but 2) ensure that a computer or navigation device user does not notice the period of time (t).

Optionally, the method 100 may include using one or more light sources that are mounted to the navigation device to illuminate the surface that is being navigated (see block 102). Depending on the configuration of a particular navigation device, the light source(s) may be activated continuously, or only during, or in sync with, activation of the first and second light sensors.

Figure 2:
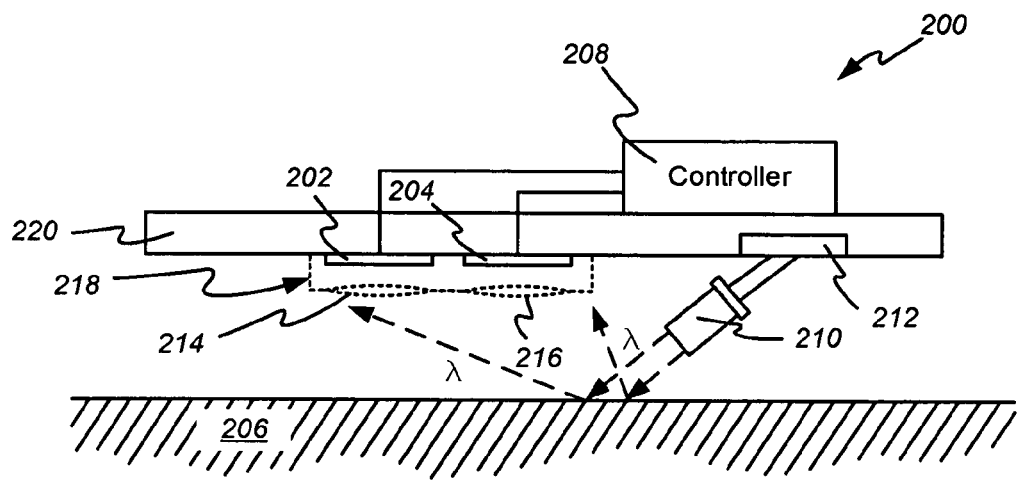
FIG. 2 illustrates exemplary apparatus for navigating a surface, which apparatus may implement the method shown in FIG. 1.

FIG. 2 illustrates exemplary apparatus 200 for navigating a surface. In one embodiment, the apparatus 200 may implement the method 100. The apparatus 200 comprises first and second light sensors 202, 204 to detect the light (Λ) that is reflected from a surface 206. The first and second light sensors 202, 204 are of different types, as will be explained more fully later in this description.

A navigation engine 302 (FIG. 3) receives the outputs of both light sensors 202, 204, and uses either 1) outputs of the first light sensor 202 over time, or 2) outputs of the second light sensor 204 over time, to determine relative movement of the apparatus 200 with respect to the surface 206. In one embodiment, the navigation engine 302 receives the outputs of both light sensors 202, 204 at the same time, and simply ignores the outputs of one or the other of the sensors. In another embodiment, the navigation engine 302 may alternately receive the outputs of one or the other of the light sensors 202, 204. For example, the navigation engine 302 could be coupled to the first and second light sensors 202, 204 by means of a switching matrix or other means (not shown) that alternately provides outputs of the first light sensor 202 or the second light sensor 204 to the navigation engine 302. Also, both of the light sensors 202, 204 may be operated continuously. Or, the light sensor that is not currently being used for navigation may be put into a standby mode or powered down until needed.

The output of the navigation engine 302 may take various forms, including that of delta-x and delta-y motion data. In one embodiment of the apparatus 200, the outputs of the navigation device 302 may be provided to a controller 208, such as an application-specific integrated circuit (ASIC), and then relayed by the controller 208 to a computer to which the apparatus 200 is attached. In another embodiment of the apparatus 200, the outputs of the navigation engine 302 may be relayed directly to a computer.

The apparatus 200 further comprises a switching control mechanism 304 (FIG. 3) to alternately cause the navigation engine 302 to 1) determine movement of the apparatus 200 using the outputs of the first light sensor 202, or 2) determine movement of the apparatus 200 using the outputs of the second light sensor 204. The switching control mechanism 304 may be communicatively coupled to the navigation engine 302, the light sensors 202, 204 and/or any switching mechanism or other circuitry that couples the light sensors 202, 204 to the navigation engine 302.

In one embodiment, the switching control mechanism 304 may comprise a user-operated manual switch that enables a user to select one light sensor 202 or the other 204 based on the navigation performance of the apparatus 200. However, in a preferred embodiment, the switching control mechanism 304 comprises a circuit to determine whether useful navigation data is being output from the navigation engine 302. If not, the switching control mechanism 304 initiates a switch of the light sensor that is used by the navigation engine 302 to determine movement of the apparatus 200.

The apparatus 200 may further comprise an analog-to-digital converter 306 (FIG. 3), via which outputs of the first light sensor 202 and the second light sensor 204 may be converted to digital values before they are provided to the navigation engine 302.

The apparatus 200 may also comprise a light source 210. The light source 210 is positioned to illuminate the surface 206 and may be driven by a driver circuit 212. If the apparatus 200 is housed within a computer mouse form factor, the light source 210 may be positioned such that, when the mouse is placed on a surface 206, light (Λ) emitted from the light source 210 tends to reflect off the surface 206 toward the light sensors 202, 204. In one embodiment, the light source 210 may be a laser light source, such as a vertical cavity surface emitting laser (VCSEL). In another embodiment, the light source 210 may be a light emitting diode (LED) light source. The light source 210 may also take other forms.

In some embodiments, one or more optical components, such as optical components 214 and 216, may be positioned adjacent the first light sensor 202, the second light sensor 204 or the light source 210. In this manner, light that is emitted by the light source 210 or reflected from the surface 206 may be focused or diffused so that an appropriate dispersion of light is reflected onto the first and second light sensors 202, 204.

In one embodiment, the light sensors 202, 204, navigation engine 302, switching control mechanism 304 and analog-to-digital converter 306 are integrated on a single navigation sensor chip 218. Alternately, these elements 202, 204, 302, 304, 306 may be implemented discretely, or in various combinations, on silicon or a circuit board. In FIG. 2, a navigation sensor chip 218 and other components are shown to be mounted to a circuit board 220.

Figure 4:
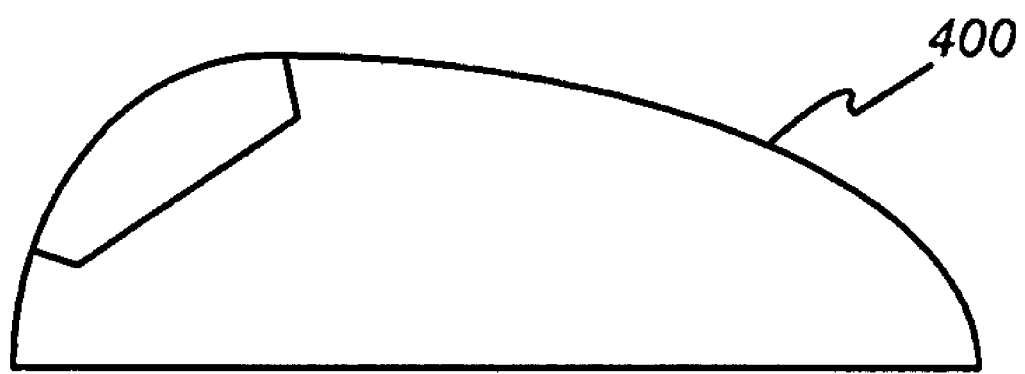
FIG. 4 illustrates a housing having a computer mouse form factor, to which the elements of the apparatus shown in FIG. 2 may be mounted.

The apparatus 200 may further comprise a housing 400 (FIG. 4) to support the first and second light sensors 202, 204, the navigation engine 302, the switching control mechanism 304, the light source 210, and any other elements of the apparatus 200. In one exemplary embodiment, the housing 400 may have a form factor of a computer mouse, as shown in FIG. 4.

As previously indicated, image-based light sensors and their associated navigation engines are often able to navigate more and different types of surfaces (as compared to other types of light sensors). As a result, the light sensor 202 may take the form of an image sensor. In one embodiment, the image sensor may output image data (e.g., arrays of pixel values) to the navigation engine 302, and the navigation engine 302 may use image correlation algorithms to 1) compare successive ones of the images output by the image sensor, and 2) use differences in the compared images to determine relative movement of the apparatus 200 with respect to the surface 206.

If the first light sensor 202 is an image sensor, the second light sensor 204 may be of a type other than an image sensor type. For example, the second light sensor 204 may be a sensor that produces time-varying x-direction and y-direction outputs, such as a speckle and/or photodiode-based sensor. A speckle or photodiode-based sensor can be useful in that it often provides outputs (e.g., sinusoidal x and y outputs) that are better suited to navigating on very smooth surfaces, such as glass surfaces.

Figure 3:
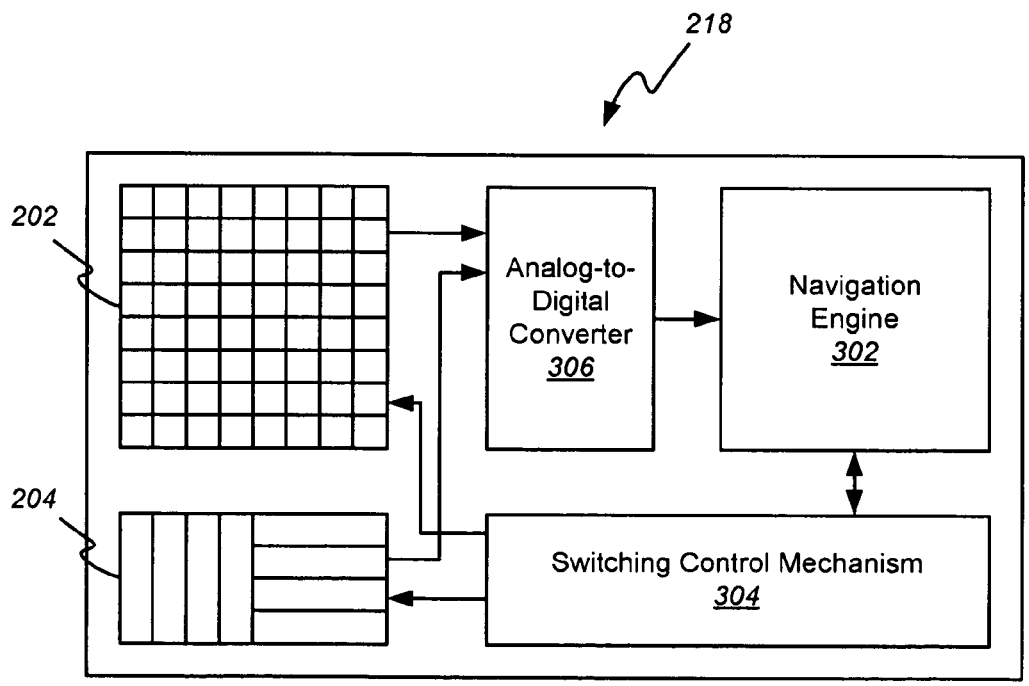
FIG. 3 illustrates exemplary elements of a navigation sensor of the apparatus shown in FIG. 2.

In one embodiment, the second light sensor 204 may be a speckle-based sensor comprising at least one photodetector strip oriented in a first direction, and at least one photodetector strip oriented in a second direction, with the first and second directions of the strips being perpendicular to each other. One exemplary layout of perpendicular photodetector (e.g., photodiode or phototransistor) strips is shown in FIG. 3. However, other layouts are certainly possible. For a more detailed discussion of exemplary speckle-based sensors, see U.S. Pat. No. 5,644,139.

Given the better performance of an image-based sensor on "most" surfaces, the image sensor 202 may be configured as the default sensor of the apparatus 200; and the speckle-based sensor 204 may be configured as a secondary sensor that is employed when the image sensor 202 is not producing useful navigation data.

Figure 5:
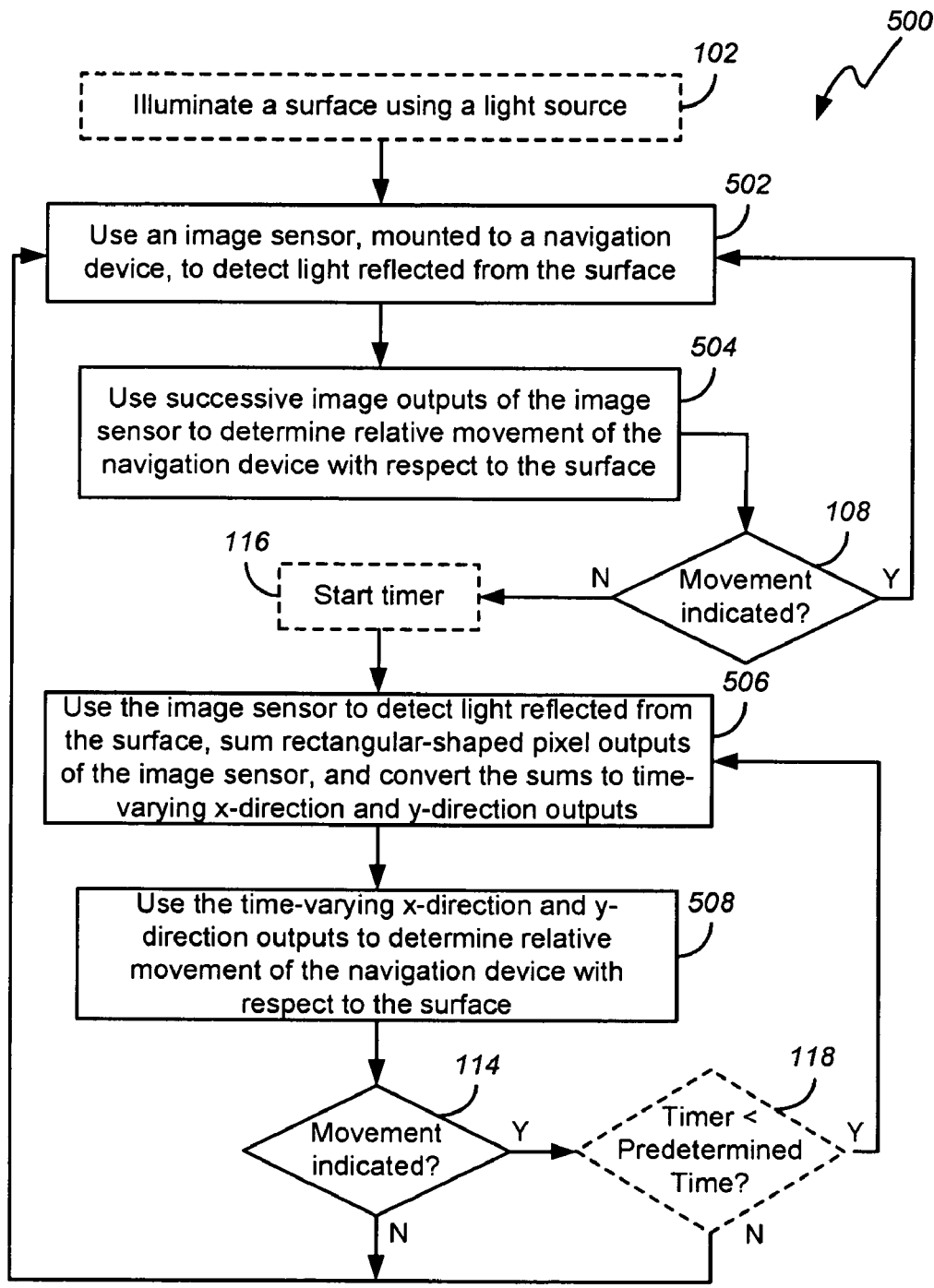
FIG. 5 illustrates a second exemplary method for navigating a surface.
Figure 6:
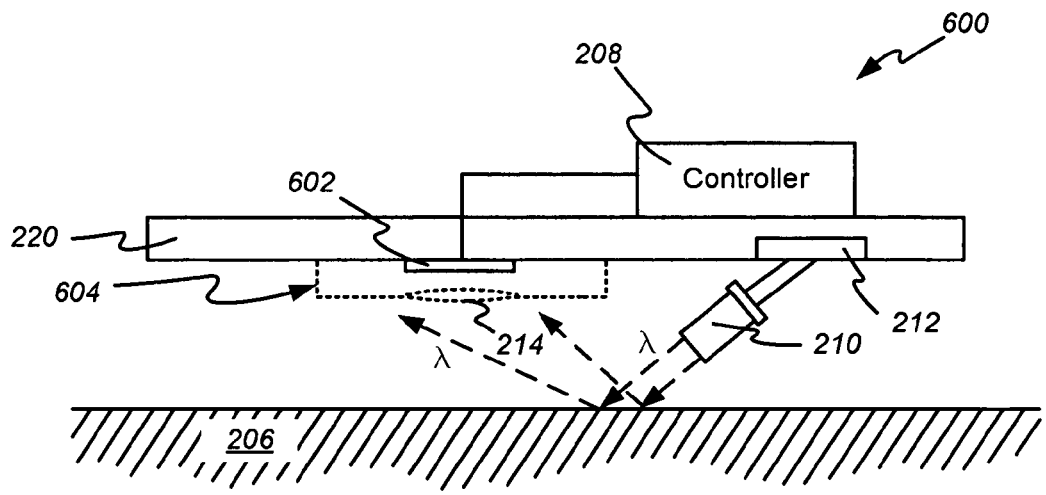
FIG. 6 illustrates second exemplary apparatus for navigating a surface, which apparatus may implement the method shown in FIG. 5.
Figure 7:
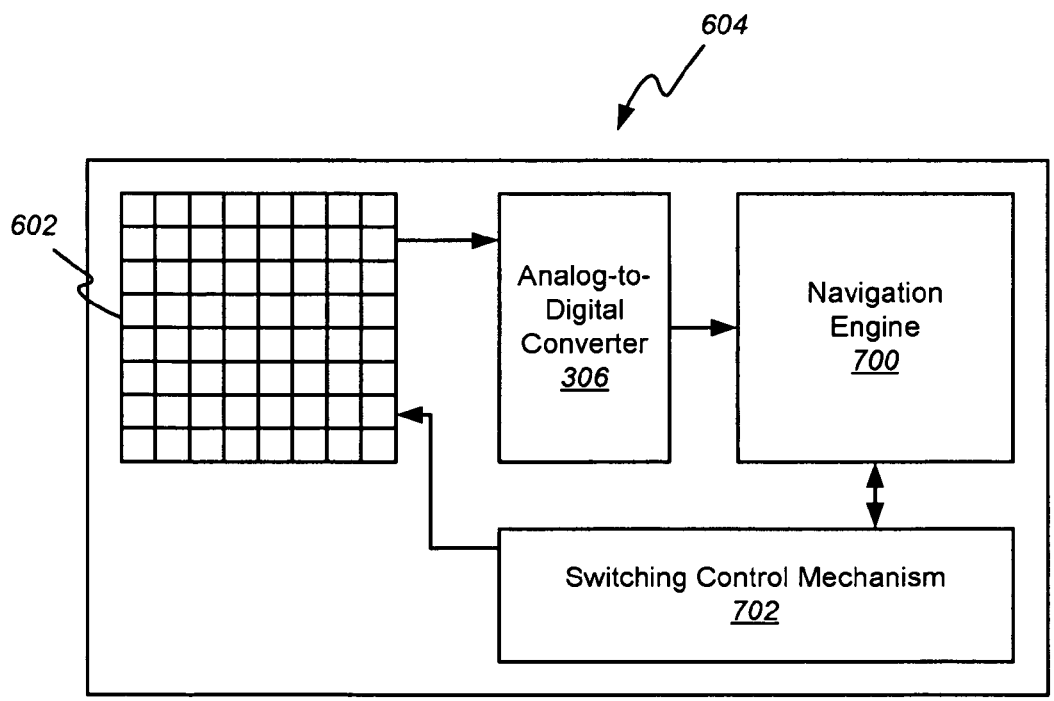
FIG. 7 illustrates exemplary elements of a navigation sensor of the apparatus shown in FIG. 6.

FIGS. 5-7 illustrate alternatives to the method 100 and apparatus 200. In accord with the method 500 (FIG. 5) and apparatus 600 (FIGS. 6 & 7), the first and second light sensors 202, 204 of the apparatus 200 are replaced with a single image sensor 602 for detecting the light reflected from a surface (see blocks 502 and 506 of method 500). Outputs of the image sensor 602 are then used by the navigation engine 700 to determine relative movement of the apparatus 600 with respect to the surface 206 (see blocks 504 and 508). A switching control mechanism 702 causes the navigation engine to determine the relative movement of the apparatus 600 with respect to the surface 206 in response to either 1) successive image outputs of the image sensor 602 (at block 504), or 2) time-varying x-direction and y-direction values that are obtained by summing rectangular-shaped sets of pixel outputs of the image sensor 602 (at block 508). In this manner, the single image sensor 602 is used to simulate the operation of a device having first and second light sensors, and the switching control mechanism 702 causes the apparatus 600 to switch between its different light sensing modes.

As shown in FIGS. 6 & 7, the image sensor 602, navigation engine 700, switching control mechanism 702 and an analog-to-digital converter 306 may be integrated in a navigation sensor 604.

What is claimed is:

1. Apparatus for navigating a surface, comprising:
   an image sensor to detect light reflected from a surface;
   a navigation engine to determine relative movement of the apparatus with respect to the surface; and
   a switching control mechanism to cause the apparatus to switch between first and second light sensing modes, the switching control mechanism being configured to cause the navigation engine to determine the relative movement of the apparatus with respect to the surface in response to successive image outputs of the image sensor during the first light sensing mode, the switching control mechanism being configured to cause the navigation engine to determine the relative movement of the apparatus with respect to the surface in response to time-varying x-direction and y-direction values obtained by summing rectangular-shaped sets of pixel outputs of the image sensor during the second light sensing mode.

2. A method for navigating a surface, comprising:
   using a first light sensor, mounted to a navigation device, to detect light reflected from a surface;
   using outputs of the first light sensor, over time, to determine relative movement of the navigation device with respect to the surface; and
   while using the first light sensor, determining whether the outputs of the first light sensor, over time, are indicating movement of the navigation device with respect to the surface, and if not, i) using a second light sensor mounted to the navigation device, which is of a different type than the first light sensor, to detect light reflected from the surface, and ii) using outputs of the second light sensor, over time, to determine relative movement of the navigation device with respect to the surface.

3. The method of claim 2, further comprising:
   while using the second light sensor, determining whether the outputs of the second light sensor, over time, are indicating movement of the navigation device with respect to the surface, and if not, reverting to using outputs of the first light sensor to determine whether there is relative movement of the navigation device with respect to the surface.

4. The method of claim 3, wherein the first light sensor is an image sensor including an array of pixels, and wherein the second light sensor is of a type other than an image sensor type and includes at least one photodetector strip oriented in a first direction and at least one photodetector strip in a second direction that is perpendicular to the first direction.

5. The method of claim 2, wherein the first light sensor is a default light sensor, the method further comprising:
   timing how long the outputs of the second light sensor are used to determine relative movement of the navigation device with respect to the surface, and after a predetermined time, reverting to using outputs of the first light sensor to determine whether there is relative movement of the navigation device with respect to the surface.

6. The method of claim 2, further comprising:
   using at least one light source, mounted to the navigation device, to illuminate the surface during use of the first and second light sensors.

* * * * *